United States Patent
Mazzitelli et al.

(10) Patent No.: US 11,985,051 B1
(45) Date of Patent: May 14, 2024

(54) DYNAMICALLY VISUALIZING SERVICE MESH TOPOLOGIES WITH EVENT-BASED MESSAGING

(71) Applicant: Red Hat, Inc., Raleigh, NC (US)

(72) Inventors: John Mazzitelli, Sicklerville, NJ (US); Jay Shaughnessy, Cherry Hill, NJ (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/166,219

(22) Filed: Feb. 8, 2023

(51) Int. Cl.
  G06F 15/173 (2006.01)
  H04L 41/22 (2022.01)
  H04L 43/045 (2022.01)

(52) U.S. Cl.
  CPC ............ H04L 43/045 (2013.01); H04L 41/22 (2013.01)

(58) Field of Classification Search
  CPC .............................. H04L 43/045; H04L 41/22
  See application file for complete search history.

(56) References Cited

U.S. PATENT DOCUMENTS

| | | | |
|---|---|---|---|
| 10,680,918 B1* | 6/2020 | Mazzitelli | H04L 67/51 |
| 11,133,994 B2* | 9/2021 | Mazzitelli | H04L 41/0803 |
| 11,329,903 B2 | 5/2022 | Takvorian | |
| 11,451,450 B2 | 9/2022 | Patki et al. | |
| 2020/0177373 A1 | 6/2020 | Komandur et al. | |
| 2021/0294717 A1 | 9/2021 | Wang et al. | |
| 2022/0021592 A1* | 1/2022 | Takvorian | H04L 41/5009 |
| 2022/0070112 A1* | 3/2022 | Mazzitelli | H04L 47/783 |
| 2023/0083701 A1* | 3/2023 | Wang | G06F 9/542 718/1 |
| 2023/0319054 A1* | 10/2023 | Hendrey | H04L 63/105 726/4 |

FOREIGN PATENT DOCUMENTS

CN 114785690 7/2022

OTHER PUBLICATIONS

"OpenShift Container Platform 4.6 Service Mesh", Oct. 13, 2022, Red Hat, Inc., https://access.redhat.com/documentation/en-us/openshift_container_platform/4.6/pdf/service_mesh/openshift_container_platform-4.6-service_mesh-en-us.pdf, 388 pages.
Indrasiri, Kasun, "The Potential for Using a Service Mesh for Event-Driven Messaging", Mar. 9, 2019, https://www.infoq.com/articles/service-mesh-event-driven-messaging/, 8 pages.

* cited by examiner

*Primary Examiner* — Padma Mundur
(74) *Attorney, Agent, or Firm* — Dority & Manning, P.A.

(57) ABSTRACT

Implementations for dynamically visualizing service mesh topologies with event-based messaging are described. An example method may include obtaining, by a processing device, topology data characterizing a service mesh comprising a plurality of nodes; obtaining tracing data associated with events processed by a message broker servicing the plurality of nodes; identifying, based on the tracing data, a message flow between at least two nodes of the plurality of nodes of the service mesh, wherein the at least two nodes represent a source and a destination of a message associated with the events; and providing, via a graphical user interface (GUI), visualization of the service mesh with the message flow.

20 Claims, 10 Drawing Sheets

220D

```
// E.g. for source node message producer:
Span span = tracer.buildSpan("Send message to consumers")
    .withTag("message_bus.destination", "my-topic")
    .withTag("peer.address", "kafka.example.com")
    .withTag("peer.service", "kafka")
    .withTag("span.kind", "producer")
    .start();
// ... push message to the broker
span.finish();
```

240D

```
SpanContext parentContext = tracer.extract(...);
Span span = tracer.buildSpan("Received message")
    .withTag("message_bus.destination", "my-topic")
    .withTag("peer.address", "kafka.example.com")
    .withTag("peer.service", "kafka")
    .withTag("span.kind", "consumer")
    .asChildOf(parentContext)
    .start();
// Process received message
span.finish();
```

DYNAMICALLY VISUALIZING SERVICE MESH TOPOLOGIES WITH EVENT-BASED MESSAGING

TECHNICAL FIELD

The disclosure is generally related to services in computer systems, and more particularly, to dynamically visualizing service mesh topologies with event-based messaging.

BACKGROUND

Services are processes, such as sequences of software instruction (code) being executed, which compute responses for client requests. For example, a client sends a request and a service responds to that request. Utilization of services allows for breaking down of complex applications into multiple independent processes. As a result, highly-decoupled systems may be produced. Each system may include multiple applications that are hosted on a provider's infrastructure.

BRIEF DESCRIPTION OF THE DRAWINGS

The disclosure is illustrated by way of examples, and not by way of limitation, and may be more fully understood with references to the following detailed description when considered in connection with the figures, in which:

FIG. 2D depicts examples of span generation codes according to one or more aspects of the disclosure;

DETAILED DESCRIPTION

Figure 1:
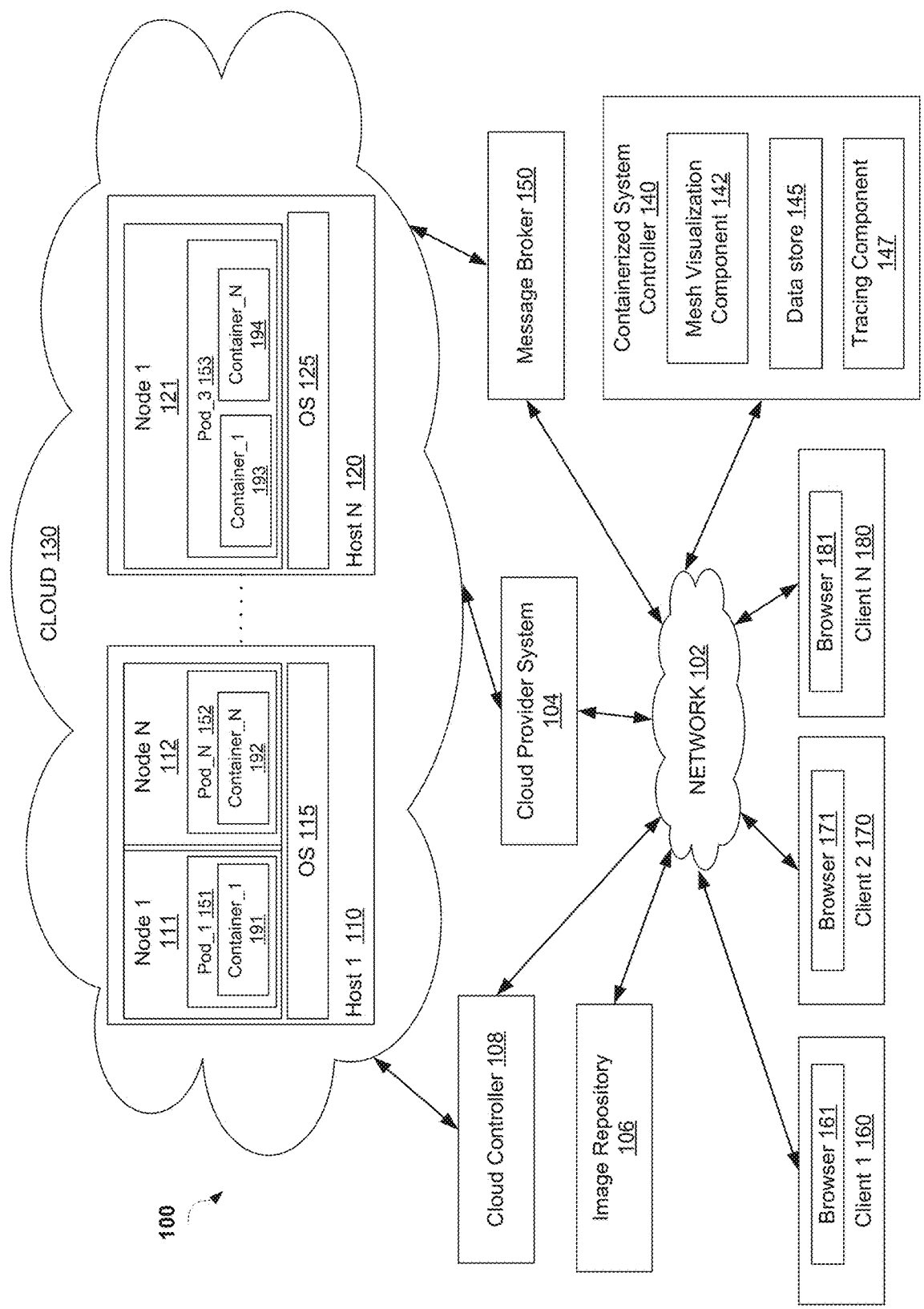
FIG. 1 depicts a high-level block diagram of an example computer system architecture, in accordance with one or more aspects of the disclosure.

Described herein is a system for dynamically visualizing service mesh topologies with event-based messaging. A service mesh is a collection of services (or microservices), which are processes (such as pieces of software instruction code) that compute responses for client requests. A services mesh topology is a representation of the interrelations and/or arrangement of components of a service mesh. For example, a client sends a request and a service responds to that request. The client can also be a service. Utilization of services allows for the breaking down of complex applications into relatively simple independent processes. As a result, highly-decoupled systems may be produced. A containerized computing services platform, such as a platform-as-a-service (PaaS) system, may implement services. The services may be executed in containers to create containerized applications in the containerized computing services platform. Containerization is an operating-system (OS)-level virtualization environment of a host machine that provides a way to isolate the service process. Each service process is focused on doing a relatively simple task to support the application for each individual container.

A service mesh may include multiple components of various types, such as workload, service, application, or versioned application. A workload can be, for example, a pod of a cluster of the containerized computing services platform. A pod refers to a group of one or more containers that are deployed together on the same node. Workloads perform the work (i.e., processing operations) within a service mesh. For example, a workload may process HyperText Transport Protocol (HTTP) requests and return HTTP responses. A service is a named endpoint that requests are sent to. A service may not perform any work, but instead requests sent to a service are routed to a workload to perform the actual work to process the service's request. A service can route to more than one workload, and a workload can process requests for one or more services. An application is made up of workloads that have an "app" label applied to them (the app name is the value of the app label). Applications can be versioned by another label called "version." If a workload has a label of "app=details" with another label "version=v1", then this workload is a "versioned app" whose name is "details v1".

In some implementations, services may use event-based communication. Events are an observable change of the state of a certain system at a particular point in time. An event processing system may detect, correlate, abstract, aggregate, and/or react to certain events. Event-based communication may use a message broker to handle event-based messages. A message broker may be an intermediary that translates a message from the messaging protocol of the sender to the messaging protocol of the receiver.

In event-based communication, a message broker can be used as an intermediate agent for receiving and delivering messages. Since each service uses the message broker for communication, the sources and destinations of messages may not be directly visualized as the connections between services using the message broker are not directly captured or represented in data or metadata identifying the service mesh configuration. Due to the various components and intricate connections between these components in a service mesh, visualizing a graph to represent the topology of the service mesh with event-based communication is not a trivial task. For example, visualizing the flow of traffic (e.g., message or signals transmitted) between services enables better deployment strategies and message routing rules. In another example, it becomes challenging to understand behavior and performance as services grow in complexity, since the events can be recorded in a log, visualizing the events-based communication along with a time aspect allows the observability of service behavior, empowering operators to troubleshoot, maintain, and optimize their applications.

Aspects of the disclosure address the above and other deficiencies by providing systems and methods that dynamically visualize service mesh topologies with event-based messaging. A mesh visualization component of a containerized computing service platform may provide various visualizations of a service mesh with a message broker implemented by the containerized computing services platform. The mesh visualization component may obtain topology data including metadata and configuration data of the services of the service mesh. The mesh visualization component may obtain and store tracing data regarding events processed by the message broker. Specifically, the tracing data may include metadata about the operation and the service in which the operation took place, and can also include one or more tags, which provide additional operation-specific metadata and can be used to identify a source and a destination for a message (from a source service intending for a destination service) transmitting through the message broker. As such, the mesh visualization component can transform the tracing data to a message flow between the source service and the destination service by matching the tags used to identify a source and a destination of the message. The mesh visualization component can render, via a graphical user interface (GUI), a graph as the visualization of the service mesh with the message flow displayed with the service mesh. While the transformed message flow is displayed, to avoid the confusion, the message broker may not be displayed (i.e., hidden). In some implementations, the service mesh may be displayed with a switch between displaying the message broker and displaying the transformed message flow with the message broker hidden.

In some implementations, the mesh visualization component may receive a user request for a particular type of service mesh graph (e.g., workload graph, versioned application graph, application graph, services graph) for a service mesh with event-based messaging ("service-event mesh graph"). Based on the user request, the mesh visualization component may access a data store to identify nodes of the service mesh and the connections between such nodes in order to generate the requested service-event mesh graph for the service mesh with event-based messaging. The service-event mesh graph is rendered for visualization via a GUI, which may be presented at a client device that originated the request for the visualization. The visualization provided via the GUI may be dynamically updated to display a different service-event mesh graph upon a user request. In some implementations, the visualization of the service-event mesh graph with hidden message broker can be switched, according to the user requests, to the visualization of the service mesh including the message broker.

Advantages of the present disclosure include dynamical visualization of service mesh topologies with event-based messaging for a computer system. In particular, aspects of the disclosure provide technology that enhances the efficiency and/or performance of visualization of service meshes with event-based messaging in a containerized computing service platform. The technology enables the visualization of the service mesh with event-based messaging in different views including hiding the message broker. The visualization may improve monitoring and debugging capabilities for a service mesh with event-based messaging. The visualization may also help increase efficiency of the service mesh with event-based messaging as the various different views enable a more precise and accurate view of the components of the service mesh with event-based messaging and the interconnections between such components, allowing for more efficient configuration of the service mesh with event-based messaging. This may decrease both the processor cycles and input/output (I/O) overhead required to implement a service mesh with event-based messaging in a containerized computing services platform. The performance enhancements may enable a computing system to reduce the amount of computing resources consumed by a containerized computing services platform and enable the computing system to support a more robust and higher-performing service mesh with event-based messaging.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as OpenShift®. The PaaS system provides resources and services (e.g., micro-services) for the development and execution of applications owned or managed by multiple users. A PaaS system provides a platform and environment that allow users to build applications and services in a clustered compute environment (the "cloud") Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes a cloud-computing environment 130 (also referred to herein as a cloud) that includes nodes 111, 112, 121 to execute applications and/or processes associated with the applications. A "node" providing computing functionality may provide the execution environment for an application of the PaaS system. In some implementations, the "node" may include a virtual machine (VM) that is hosted on a physical machine, such as host 1 110 through host N 120, implemented as part of the cloud 130. For example, nodes 111 and 112 are hosted on physical machine of host 1 110 in cloud 130 provided by cloud provider 104. In some implementations, nodes 111, 112, 121 may additionally or alternatively include a group of VMs, a container (e.g., container 191, 192, 193, 194), or a group of containers to execute functionality of the PaaS applications. When nodes 111, 112, 121 are implemented as VMs, they may be executed by operating systems (OSs) 115, 125 on each host machine 110, 120. It should be noted, that while one cloud provider system has been depicted in FIG. 1, in some implementations more or fewer cloud service provider systems (and corresponding clouds) may be present.

In some implementations, the host machines 110, 120 are often located in a data center. Users can interact with applications executing on the cloud-based nodes 111, 112, 121 using client computer systems, such as clients 160, 170 and 180, via corresponding web browser applications 161, 171 and 181. In other implementations, the applications may be hosted directly on hosts 1 through N 110, 120 without the use of VMs (e.g., a "bare metal" implementation), and in such an implementation, the hosts themselves are referred to as "nodes".

In various implementations, developers, owners, and/or system administrators of the applications may maintain applications executing in cloud 130 by providing software development services, system administration services, or other related types of configuration services for associated nodes in cloud 130. This can be accomplished by accessing cloud 130 using an application programmer interface (API) within the applicable cloud service provider system 104. In some implementations, a developer, owner, or system administrator may access the cloud service provider system 104 from a client device (e.g., clients 160, 170, 180) that includes dedicated software to interact with various cloud components. Additionally, or alternatively, the cloud service provider system 104 may be accessed using a web-based or cloud-based application that executes on a separate computing device that communicates with client device via a network 130.

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In some implementations, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from containerized system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121. This data may be used for the execution of applications for a containerized computing services platform managed by the containerized system controller 140.

In some implementations, the data is used for execution of containers 191, 192, 193, 194 in one or more pods 151, 152, 153. Each of the pods 151, 152, 153 is a group of one or more containers that are deployed together on the same node 111, 112, 121, and are the smallest compute unit that can be defined, deployed, and managed in the containerized computing service environment. Each pod 151, 152, 153 is allocated its own network address (e.g., IP address), with containers 191, 192, 193, 194 within pods 151, 152, 153 being able to share local storage and networking. Pods 151, 152, 153 have a lifecycle that is defined and can run on a node 111, 112, 121 until the pod's containers exit or they are removed for some other reason.

The containers 191, 192, 193, 194 can include application images built from pre-existing application components and source code of users managing the application. An image may refer to data representing executables and files of the application used to deploy functionality for a runtime instance of the application. In one implementation, the image can be built using a Docker™ tool and is referred to as a Docker image. In other implementations, the application images can be built using other types of containerization technologies. A container 191, 192, 193, 194 is a secure process space on the node 111, 112, 121 and used to execute functionality of an application. In some implementations, a container 191, 192, 193, 194 is established at the nodes 111, 112, 121 and 122 with access to certain resources of the underlying node, including memory and storage. In one implementation, the containers 191, 192, 193, 194 may be established using the Linux Containers (LXC) method. In further implementations, containers 191, 192, 193, 194 may also be established using cgroups, SELinux™, and kernel namespaces, to name a few examples.

In some implementations, the network architecture 100 includes a message broker 150 that is connected with cloud 130. The message broker 150 may be a functional component for routing messages to one or more destinations, transforming messages to other representations, message storage, message validation, or message transaction management. The message broker 150 may facilitate communication among applications and minimize the mutual awareness that applications would have of each other in order to be able to exchange messages, effectively implementing decoupling of endpoints. The message broker 150 may be used in an event-based communication to send messages between a sender service and a receiver service using a particular structure and/or format for the messages. For example, messages may use Extensible Markup Language (XML) or JavaScript Object Notation (JSON) with a protocol, such as Data Distribution Service (DDS) or Advanced Message Queuing Protocol (AMQP).

In some implementations, the containerized system controller 140 may implement a tracing component 147 to trace logical or business transactions handled by or through the message broker 150, including transactions that spread over network calls involving different hosts or processes. In some implementations, as described below in detail, the tracing component 147 collaborates with the mesh virtualization component 142 to provide message flow information between different hosts or processes that use the message broker 150. Although tracing component 147 is illustrated as part of containerized system controller 140, tracing component 147 may be maintained separately from containerized system controller 140.

In some implementations, the containerized system controller 140 may implement a mesh virtualization component 142. The mesh visualization component 142 may provide visualizations of a service mesh with event-based messaging implemented by containerized system controller 140 via nodes 111, 112, 121. For example, nodes 111, 112, 121 may be utilized to implement a service mesh with event-based messaging that deploys services via pods 151, 152, 153. Pods 151, 152, 153 can provide the workload of the services of the service mesh. The mesh visualization component 142 may provide the visualizations of the service mesh with event-based messaging to one or more requesting users at client devices 160, 170, 180. For example, in response to a request for a particular mesh graph, mesh visualization component 142 may transmit generated visualization data to client device 160, 170, 180 to be rendered via a GUI for display to the requesting user using, for example, browser 161, 171, 181 at client device 160, 170, 180.

As discussed above, a service mesh can include components such as workloads, applications, and services. The components of the service mesh can be represented in a graph of directed nodes with nodes in the graph representing the services of the service mesh, and the event-based messaging may be represented by message flows between the nodes without showing a message broker used in the event-based messaging. Such a graph may be referred to herein as a service mesh graph with event-based messaging, a service-event mesh graph, or a graph. A service-event mesh graph may represent each workload, application, and service as a node in the service-event mesh graph. Nodes in the service-event mesh graph may be connected to one another based on which nodes are communicating with one another.

Mesh visualization component 142 may provide visualization of the service-event mesh based on the topology data and tracking data of the services of the service mesh with event-based messaging. The topology data and the tracking data may be stored in a data store 145 maintained by containerized system controller 140. Although data store 145 is illustrated as part of containerized system controller 140, data store 145 may be maintained separately from containerized system controller 140.

Mesh visualization component 142 may obtain the topology data (e.g., metadata and/or configuration data) regarding the nodes of the service mesh. The metadata may include, e.g., the names and/or labels of the applications, services, or workloads. The topology data may include, e.g., data regarding the manners the applications, services, or workloads communicate in, the relations of nodes to each other. In some implementations, mesh visualization component 142 may access data store 145 to determine which workloads communicate with one another. In one implementation, each workload in a service mesh is associated with a service. The service provides a description of the functionality that the workload implements. The service is itself an exposed application programming interface (API) interface of the workload. The exposed API can identify other services (and thereby workloads) to which the service communicates. By examining the exposed API interface (e.g., service) of the workload, the mesh visualization component 142 can determine which workloads are communicating with one another to obtain the topology data.

Mesh visualization component 142 may obtain tracing data (for example, from tracing component 147) regarding events processed by the message broker 150. The tracing data may include data, such as automatically generated event identifiers, or context headers, used to trace logical or business transactions (e.g., tracing 221, 223) in a running software associated with the message broker 210, including transactions that spread over network calls involving different hosts or processes, and can be stored in a tree data structure as explained below in detail.

In one implementation, mesh visualization component 142 may receive a user request for a particular type of service-event mesh graph (e.g., workload graph, versioned application graph, application graph, services graph), and in response, access data store 145 to identify the service-event mesh nodes and the connections (e.g., message flows) between such nodes in order to generate the requested service-event mesh graph. The details of mesh visualization component 142 are illustrated with FIGS. 2A-5.

Figure 2A:
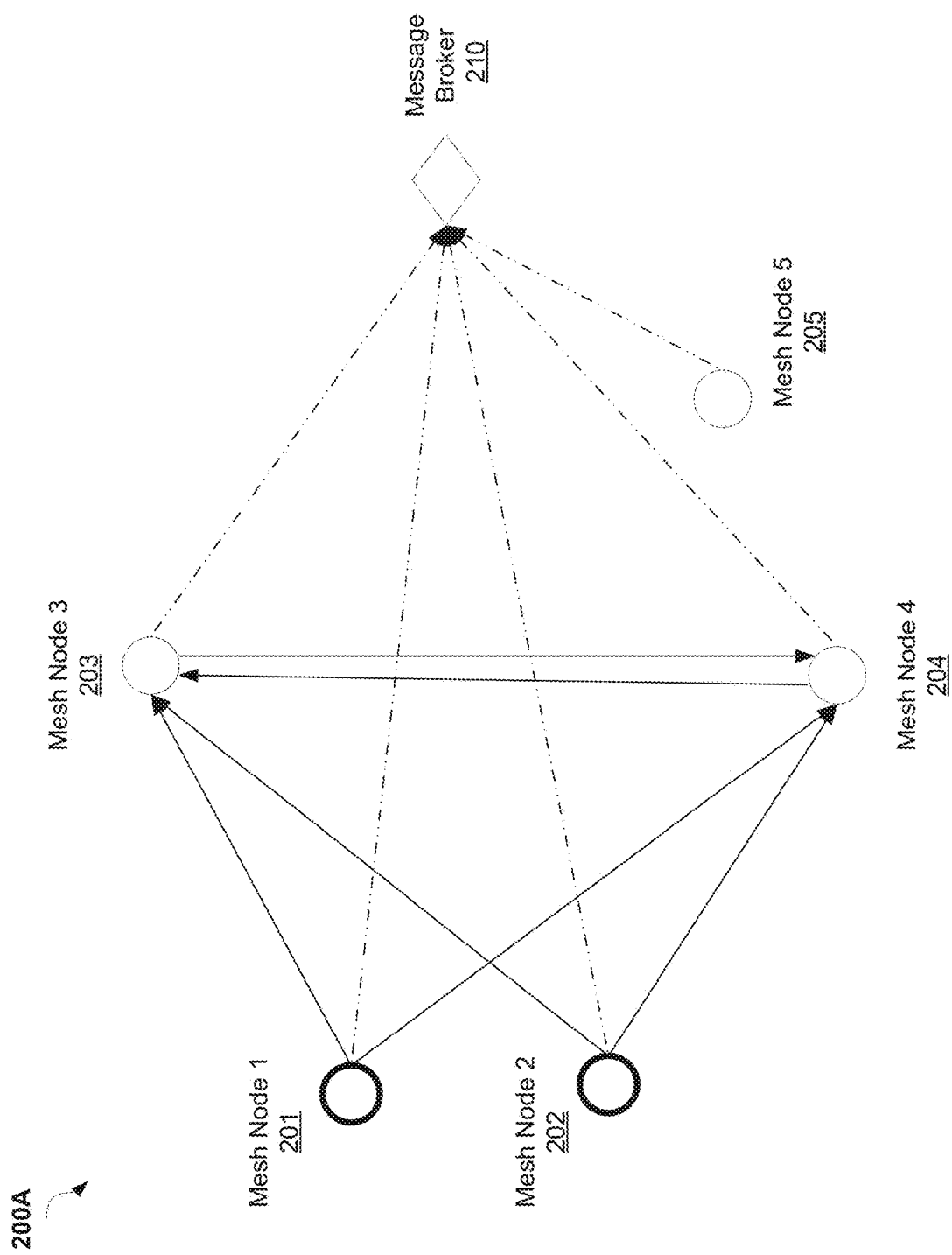
FIGS. 2A-2C depict examples of visualizations of a service mesh with event-based messaging according to one or more aspects of the disclosure.
Figure 2B:
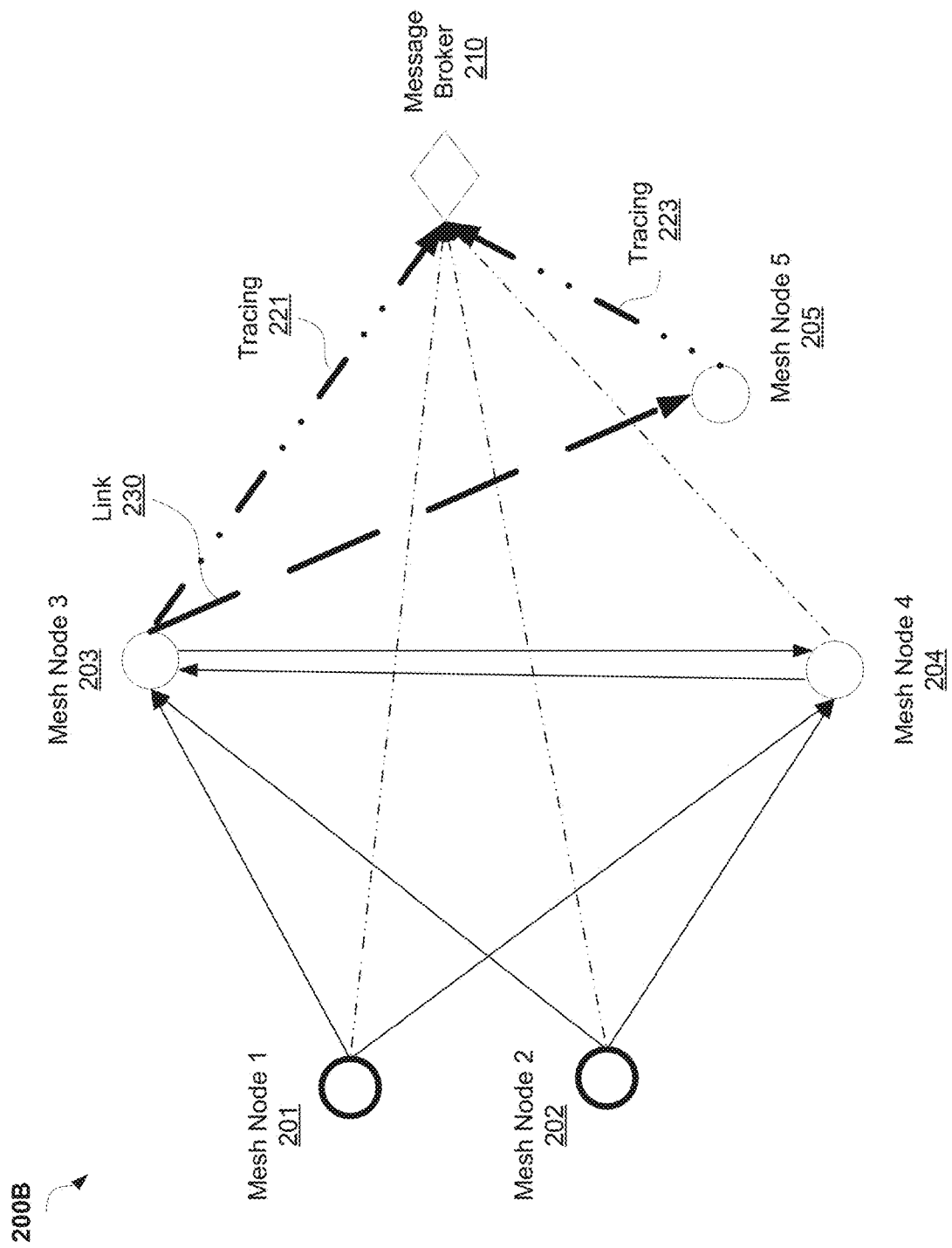
Figure 2C:
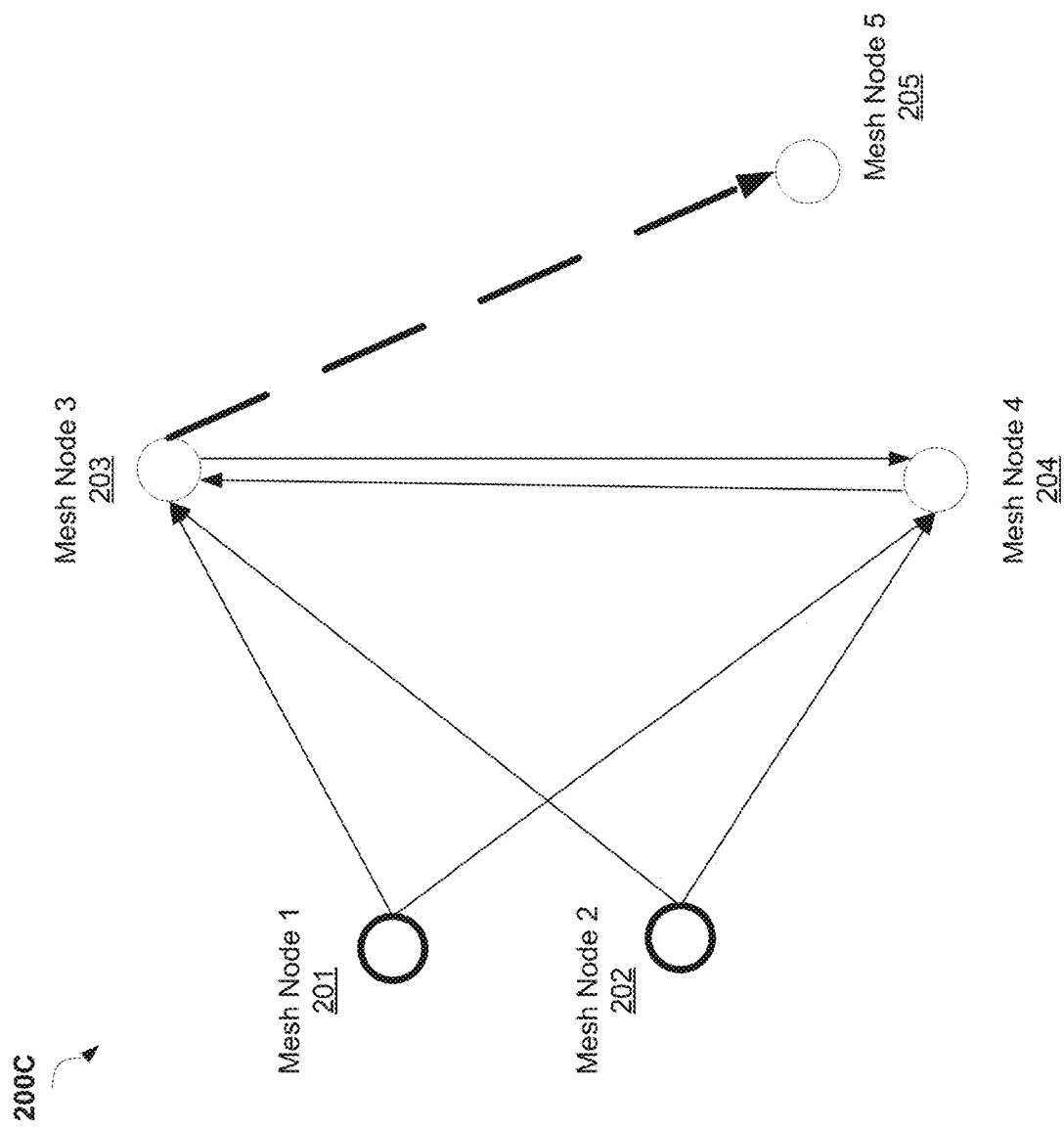

FIGS. 2A, 2B and 2C are example depictions of service-event mesh graph generated by mesh visualization component 142, in accordance with implementations of the disclosure. The service-event mesh graph shown in FIGS. 2A-2C may be provided to a user device for display via a GUI. In FIGS. 2A-2C, mesh nodes are denoted with the "circle" nodes, which can represent workloads, services, applications, or versioned applications. Each of mesh node 201 and mesh node 202 may be a source of message (e.g., a user request such as a browser making direct requests). Each of mesh node 203 and mesh node 204 may be a destination of message (e.g., data store specified in a user request). Mesh node 203 and mesh node 204 may also communicate with each other directly. The solid line with arrow may represent service-to-service communication directing from a source to a destination of the message.

The "diamond" node represents a message broker that uses event-based communication for the mesh nodes. For example, each mesh node (mesh node 201, 202, 203, 204, 205) can communicate with the message broker 210, which may process the received message for further communication. The dashed line with arrow may represent event-based communication directing from a source of the message to the message broker.

FIG. 2A is an example depiction of a mesh graph 200A of a service mesh with a message broker, in accordance with an implementation of the disclosure. The mesh graph 200A may be a type of a workload graph, a service graph, an application graph, or a versioned application graph.

The workload graph depicts every workload in the service mesh, and ignores the metadata associated with the workloads. As a result, the mesh visualization component 142 can provide a visualization of the service mesh even if labels are not used on workload in the service mesh. As described above, the mesh visualization component 142 may access data store 145 to determine which workloads communicate with one another. In one implementation, each workload in a service mesh is associated with a service. The service provides a description of the functionality that the workload implements. The service is itself an exposed application programming interface (API) interface of the workload. The exposed API can identify other services (and thereby workloads) to which the service communicates. By examining the exposed API interface (e.g., service) of the workload, the mesh visualization component 142 can determine which workloads are communicating with one another in order to represent such workloads as connected in the workload graph type of visualization of the service mesh.

The service graph depicts every service in the service mesh. The service graph hides all applications and workloads of the service mesh and instead shows all services of the service mesh. The service graph provides a high-level conceptual view of the service mesh.

The versioned application graph depicts every application in the service mesh and also groups any versioned application in a composite "version box." The versioned application graph type utilizes the metadata associated with the workloads to group the workloads. In other words, the versioned application graph type analyzes any "app" or "version" labels that are associated with a workload in data store 145. These labels may be assigned to a workload when the microservice is configured by an administrator in the containerized computing service platform. The labels may be stored as metadata of a workload in data store 145. Mesh visualization component 142 may access data store 145 to determine the labels associated with each workload and, as such, visualize and contextualize the associated apps to one another.

The application graph depicts each application in the service mesh and aggregates all versioned application into a single application node. The application graph is similar to the versioned application graph, except for the aggregation of all versions of an application into a single node.

The message broker 210 may an event streaming platform used to collect, process, store, and integrate data at scale. The message broker 210 can be used in distributed logging, stream processing, data integration, and publication/subscription messaging. An event is any type of action, incident, or change that is identified or recorded by software or applications (e.g., a payment, a website click, or a temperature reading, along with a description of what happened), and the message broker 210 can model events as key/value pairs. Keys and values are sequences of bytes and can be structured objects represented in various language type systems, and thus the message broker 210 can provide translation between language types and internal bytes (serialization and deserialization). The message broker 210 can handle incoming requests to write new events into a data store and read the events from the data store. The message broker 210 can capture new events into event streams. An event stream records the history of happening in the system as a sequence of events.

As shown in FIG. 2B, the tracing component 147 can trace logical or business transactions (e.g., span 221, 223) in a running software associated with the message broker 210, including transactions that spread over network calls involving different hosts or processes. Tracing a transaction means catching all events, or actions, following some causality or sequential relationships. The tracing component 147 can provide the tracing data, where an element describing a single event or action is denoted as a "span" and the interrelated collection of spans is denoted as a "trace", occurring along a timeline (e.g., a duration), with parental relationships (i.e., message flows) and a single root. The span 221, 223 can overlay on top of the graph topology as shown in FIG. 2B.

For example, a user request can be represented by a trace, and the trace can be partitioned into multiple spans, each span representing a single logical operation within the trace (e.g., one span represents a function call during the user request). In other words, a trace refers to a collection of operations that represents a unique transaction handled by the running software and its constituent services, and a span represents a single operation within a trace. A span may refer to another span as its parent or child, indicating a relationship between operations involved in the trace. For example, if span A makes a service call that triggers the operation captured by span B, span A is a parent span and span B is a child span. Each span can contain metadata about the operation captured by the span and the service in which the operation took place, and the metadata can include a set of basic metadata including information of the service and operation. Each span can also include one or more tags, which provide additional operation-specific metadata. A node may generate a span, and the span generation code may be manually created by the developer of the source node and destination node, or automatically performed by the software library used to send and receive messages to/from the message broker 210.

Figure 2E:
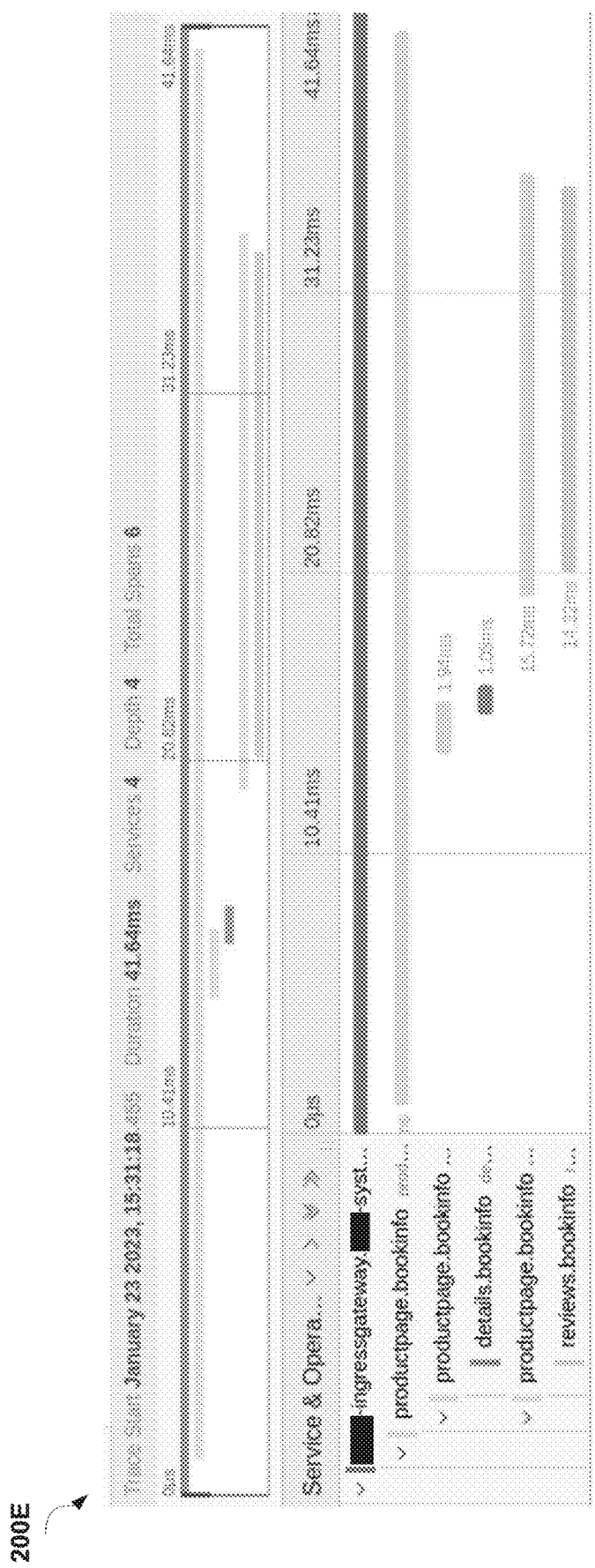
FIGS. 2E-2F depict examples of a trace with multiple spans and a span with multiple tags according to one or more aspects of the disclosure.
Figure 2F:
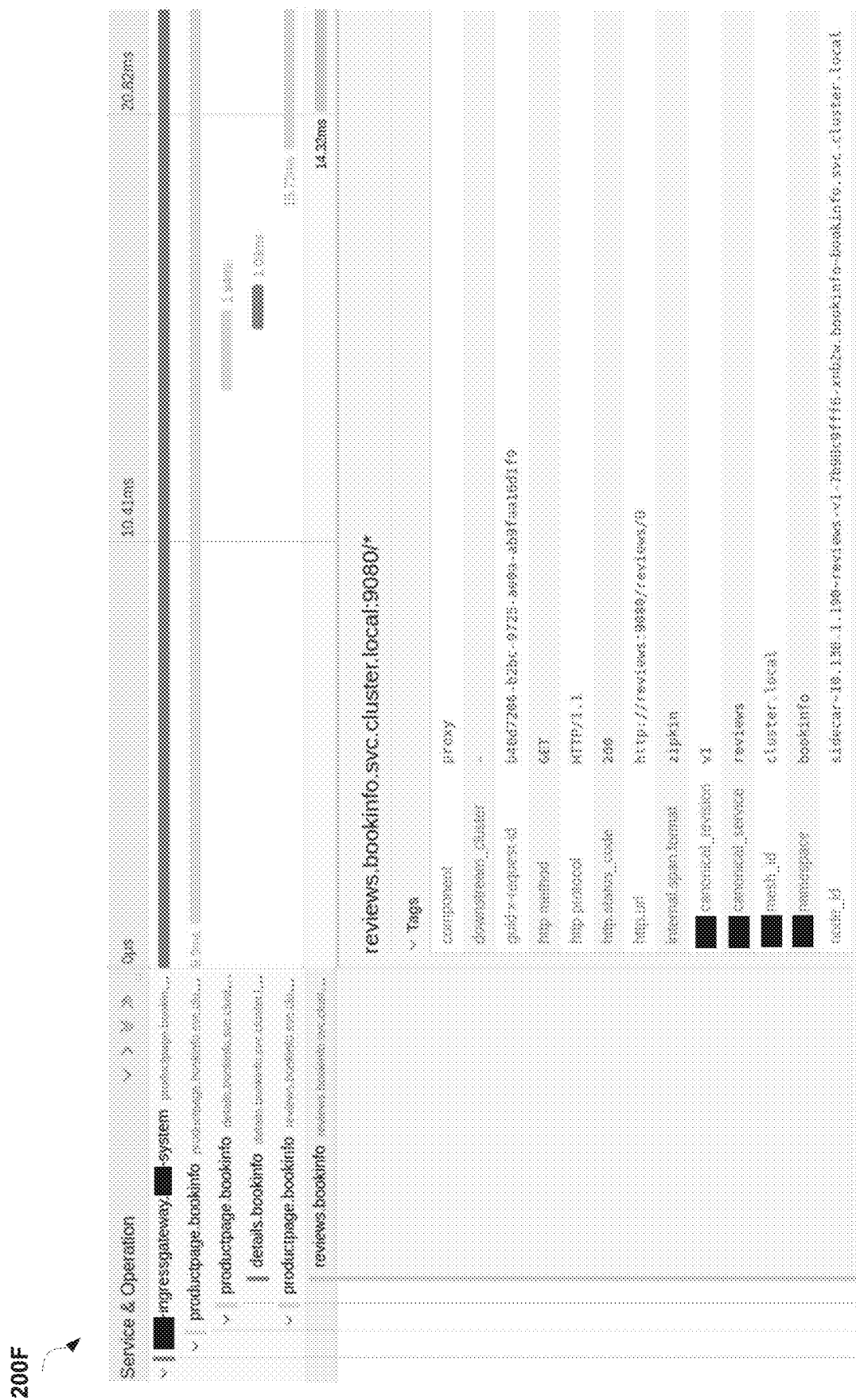

FIG. 2E illustrates a trace with multiple spans and FIG. 2F illustrates example tags associated with one span. As shown in FIG. 2E, a trace occurs from 0 μs to 41.64 μs, with six spans. As shown in FIG. 2F, the tags for "reviews.bookinfo" span includes "component," "http.method," etc. For example, the "component" tag may denote the software package, framework, library, or module that generated the associated span, and the "http.method" tag may denote the HTTP method of the request for the associated span (e.g., "GET", "POST").

In some implementations, a source node (e.g., mesh node 203) may have a message that is to be sent to a destination node (e.g., mesh node 205) via a message broker. The source node may generate a parent span with appropriate metadata (e.g., basic information of the operation, or one or more tags) and send, to the message broker 210, the parent span along with the message. Here, the parent span with appropriate metadata is associated with the to-be-sent message of the source node, and thus, the metadata of the parent span may include the basic information of operations associated with the to-be-sent message and various tags such as "span.kind" (to denote the span relates to the source node or the destination node), "message bus.destination" (to denote an address at which messages can be exchanged, that is, which event queue the span involves (there can be many event queues that a source can send messages to and destinations can consume messages from)), "peer.address" (to denote remote address), "peer.hostname" (to denote remote hostname), and "peer.service" (to denote remote service name). For example, the to-be-sent message is a user request, the operation associated with the to-be-sent message is a function call during the user request, and the basic information of the operation can include the name of function call, etc. FIG. 2D shows span generation code 220D to generate a parent span generated by a source node. While sending the parent span along with the message to the message broker 210, for example, through an API call, the source node may send the same parent span to the tracing component 147, and the tracing component 147 may store the parent span in a data store.

In some implementations, the destination node (e.g., mesh node 205) may poll for messages or subscribe for messages through a polling or subscription API call. Specifically, to poll for messages, the destination node may periodically connect to the message broker 210 and request to forward any messages that the message broker 210 might have stored for the destination node; to subscribe for messages, the destination node may send a single subscription request to the message broker 210 requesting to push, to the destination node, any messages that the message broker 210 might eventually receive for the subscribing node, as soon as such messages are received by the message broker 210. The destination node may generate a child span with appropriate metadata (e.g., basic information of the operation, one or more tags). Here, the child span with appropriate metadata is associated with the received message of the destination node, and thus, the metadata of the child span may include the basic information of operations associated with the received message, and various tags such as "span.kind" (to denote the span relates to the source node or the destination node), "message bus.destination" (to denote an address at which messages can be exchanged, that is, which event queue the span involves (there can be many event queues that a source can send messages to and destinations can consume messages from)), "peer.address" (to denote remote address), "peer.hostname" (to denote remote hostname), and "peer.service" (to denote remote service name). FIG. 2D shows span generation code 240D to generate a child span generated by a destination node. Upon creating the child span, the destination node may send the child span to the tracing component 147, and the tracing component 147 may store the child span in a data store. As such, the tracing component 147 provide the tracing data, which includes spans with appropriate metadata, and the mesh visualization component 142 can use the tracing data, for example, by comparing and matching the tags, to identify the message flow relationship for a message (e.g., request) from a source node via a message broker to a destination node.

As shown in FIG. 2D, each span generation code 220D, 220E generates a span with the "message bus.destination" tag referring to a same message broker "my-topic." The span generation code 220D generate the parent span with the "span kind" tag referring to "producer" (i.e., source), and the span generation code 220E generate the child span with the "span kind" tag referring to "consumer" (i.e., destination). By comparing and matching the tags of the parent span and the tags of the child span, the mesh visualization component 142 can determine that the parent span and child span belong to the same trace, and thus identify a message flow between the source node and the destination node.

For example, mesh node 203 may send a request (using HTTP or other application-level protocol) to the message broker 210. The request may include a message that is to be sent to mesh node 205. The mesh node 203 can generate a span 221 with one or more tags that can be used to identify the source node and the destination node and send the span 221 with the tags to tracing component 147, where the tracing component 147 can store the span 221 with tags as tracing data. When the mesh node 205 receives the message from the message broker 210, for example, by polling or subscribing messages, the mesh node 205 can generate a span 223 with one or more tags that can be used to identify the source node and the destination node and send the span 223 with the tags to tracing component 147, where the tracing component 147 can store the span 223 with tags as tracing data. By comparing and matching the tags of the span 221 and the tags of the span 223, the mesh visualization component 142 can determine that two spans 221, 223 belong to the same trace. This results in the context propagation, and the mesh visualization component 142 can identify the message flow relationship 230 through the span 221, 223 with tags.

The tracing component 147 can provide the tracing data, which includes tags used to identify the message flow relationship for a message (e.g., request) from a source node via a message broker to a destination node. For example, various tags (e.g., provided in OpenTracing semantic conventions) can be used, such as "span.kind" (to denote which span relates to the source node and which relates to the destination node), "peer.address", "peer.hostname", and "peer.service".

As such, the mesh visualization component 142 can transform the tracing data to the message flow relationship 230 using these tags, and thus identify the message flow relationship 230 for the for a message (e.g., request) from mesh node 203 via the message broker 210 to mesh node 205

As such, the mesh visualization component 142 can transform the tracing data to a message flow between two nodes of the service mesh, where the two nodes represent a source and a destination of a message transmitted via a message broker. In some implementations, the mesh visualization component 142 may identify, by matching metadata (e.g., tags described above) associated with the events, two nodes representing the source and the destination of the message associated with the events. As shown in FIG. 2B, the mesh node 203 can create a parent span with one or more tags. The mesh node 205 can extract the tags from the request and create the child span by adding the same tags to create a child span. As such, the tracing component 147 provide the tracing data, which includes tags used to identify the message flow relationship for a message (e.g., request) from a source node via a message broker to a destination node. The mesh visualization component 142 can therefore match the tags associated with the spans to correlate the trace having the spans, and identify the message flow 230 between the mesh node 203 and the mesh node 205 (i.e., the dashed line 230 pointing from the source to the destination).

As shown in FIG. 2C, the mesh graph 200C of the service mesh with the message broker are shown with a message flow relationship between mesh node 203 and mesh node 205, hiding the message broker 210. That is, mesh node 203 (e.g., a client device running a browser application) makes a direct request to the mesh node 205, as shown in the heavier weighted dashed line.

In some implementations, the mesh visualization component 142 can switch between the mesh graph 200A and the mesh graph 200C based on a user request. That is, FIG. 2A shows a "technical" (or physical) relationship between mesh nodes (i.e., without hiding the message broker 210), while FIG. 2C shows a "business" (or logical) relationship between mesh nodes (i.e., with the message broker 210 hidden). The technical relationship between the mesh nodes means the traffic (e.g., messages or signals) flows physically between the mesh nodes and the message broker regardless of the traffic's sources and destinations. In the example of FIG. 2A, the traffic flows from mesh node 201 to mesh node 203, from mesh node 202 to mesh node 203, from mesh node 201 to mesh node 204, from mesh node 202 to mesh node 204, from mesh node 203 to mesh node 204, and from mesh node 204 to mesh node 203. In addition, the traffic flows from each mesh node 201, 202, 203, 204, 205 to message broker 210. The business relationship between the mesh nodes means the traffic (e.g., messages or signals) flows logically between the mesh nodes as sources and destinations, ignoring the intermediate during the flow. In the example of FIG. 2C, the traffic flows from mesh node 201 to mesh node 203, from mesh node 202 to mesh node 203, from mesh node 201 to mesh node 204, from mesh node 202 to mesh node 204, from mesh node 203 to mesh node 204, and from mesh node 204 to mesh node 203. In addition, the traffic flows from mesh node 203 to mesh node 205, although message broker 210 is used for the traffic flow between the mesh node 203 and mesh node 205 but is not included in showing the business relationship.

Although not shown in FIGS. 2A-2C, the mesh visualization component 142 can provides the mesh graph with an indication that an error is occurring in the service mesh at a particular connection between the mesh nodes. In some implementations, other techniques to depict an error may be utilized, such as colors, to depict the existence of and/or criticality of errors, and so on.

In some implementations, the mesh visualization component 142 provides a feature to show or hide the services for a workload as part of the generated visualization. Showing and hiding services may be a feature applied to the workload graph type, the versioned application graph type, and the application graph type. In some implementations, the show and hide service feature may also be referred to as the enable service nodes feature, inject service nodes feature, a service node display enablement feature, or a service nodes-injected feature.

Mesh visualization component 142 may also apply connection labels to the various mesh graph that are generated in order to depict real-time performance data corresponding to the service mesh. For example, mesh visualization component 142 may apply connection labels to the various mesh graph to indicate real-time performance data corresponding to request rate, response time, and percentage distribution of requests, to name a few examples. This connection label data may be dynamically updated to provide an end-user with real-time feedback regarding the performance of connections in the service mesh. Visualization cues may also be applied to the connections to indicate status, such as color, highlighting, weighting, line effect, and so on. For example, the visualization cues may indicate whether an error is occurring on a connection as well as the status of the error (critical, high, caution, above average, etc.). In one implementation, mesh visualization component 142 may obtain the performance data for the connection labels from data store 145, which may be updated in real-time with such performance data.

The connection labels applied by mesh visualization component 142 may also include security information. In one implementation, the security information may indicate which connections are subject to a secure transport. For example, a connection using HTTP secure (HTTPS) protocol may be marked or otherwise indicated as being a secure connection between nodes in the service mesh graph visualization.

In some implementations, the connection labels applied by the mesh visualization component 142 may include badges. The badges can indicate something unique about the connection that is outside of the strict topology of the service mesh. For example, a badge may indicate that a virtual service or routing rule is applied to a particular connection represented by a connection. A virtual service or a routing rule may refer to a rule that dictates how requests should be routed to a node. For example, a virtual service/routing rule may state that 70% of traffic (e.g., messages) should be routed to a version 1 workload node while the other 30% of the traffic should be routed to a version 2 workload node.

While various implementations are described in terms of the environment described above, the facility may be implemented in a variety of other environments including a single, monolithic computer system, as well as various other combinations of computer systems or similar devices connected in various ways.

Figure 3:
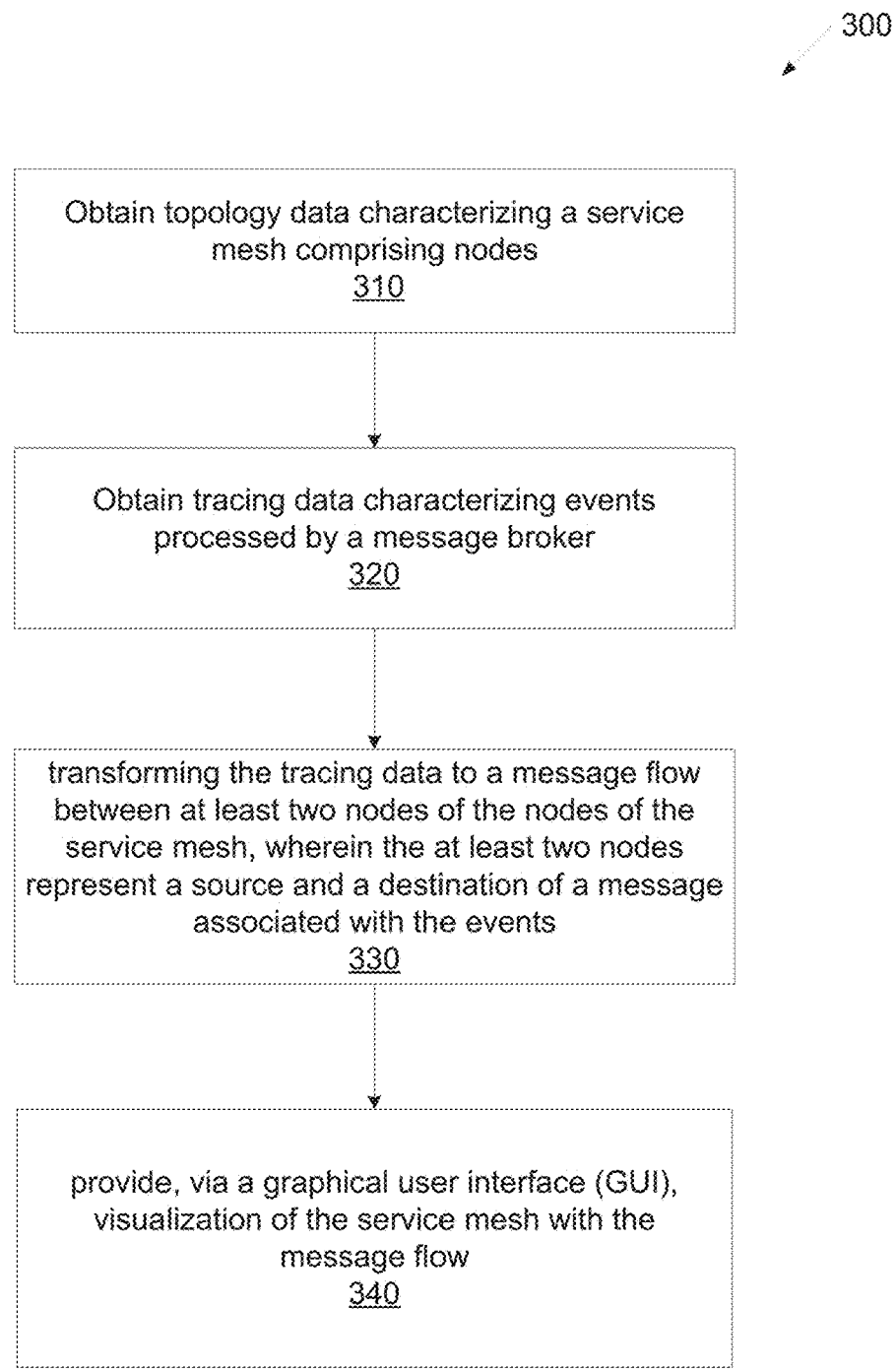
FIG. 3 depicts a flow diagram of an example method for dynamically visualizing service mesh topologies with event-based messaging in accordance with one or more aspects of the disclosure.

FIG. 3 depict a flow diagram for an illustrative example of a method 300 for dynamically visualizing service mesh topologies with message flows based on a message broker, in accordance with one or more aspects of the disclosure. Method 300 may be performed by processing devices that may comprise hardware (e.g., circuitry, dedicated logic, programmable logic, microcode, etc.), executable code (such as is run on a general purpose computer system or a dedicated machine), or a combination of both. Method 300 and each of their individual functions, routines, subroutines, or operations may be performed by one or more processors of the computer device executing the method. In certain implementations, method 300 may each be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, method 300 may be performed by computer system 100 as shown in FIG. 1.

Referring to FIG. 3, method 300 may be performed by processing devices of a server device or a client device. At operation 310, the processing device may obtain topology data characterizing a service mesh, where the service mesh includes a set of nodes. In one implementation, the nodes may include workload nodes, application nodes, and service nodes of a containerized computing services platform. The processing device may obtain topology data by determining connections between the nodes using exposed application programming interface (API) services of workloads of the service mesh and labels of the workloads.

At operation 320, the processing device may obtain tracing data associated with events processed by a message broker. In some implementations, the tracing data may include one or more tags added to the events processed by the message broker.

At operation 330, the processing device may, in view of the tracing data, identify a message flow between at least two nodes of the nodes of the service mesh, where the at least two nodes represent a source and a destination of a traffic associated with the events. The processing device may identify, by matching metadata associated with the events, the at least two nodes representing the source and the destination of the traffic associated with the events. Matching the metadata may involve matching one or more tags associated with at least two events to correlate the at least two events to identify the message flow and the at least two nodes representing the source and the destination of the message associated with the at least two events. As such, the process device transforms the tracing data to the message flow between the at least two nodes.

At operation 340, the processing device may provide, via a graphical user interface (GUI), visualization of the service mesh with the message flow, where the message broker is hidden in the visualization. The processing device may receive a request for a type of visualization of the service mesh including the nodes. The type of the visualization includes at least one of a workload graph, a versioned application graph, an application graph, or a services graph. The workload graph depicts all workload nodes in the service mesh, the versioned application graph depicts all versions of all application nodes in the service mesh, the application graph depicts a single aggregated version of each application node in the service mesh, and the services graph depicts all service nodes in the service mesh. In some implementations, the processing device may switch between the visualization of the service mesh with the message flow and a visualization of the service mesh with the message broker.

Figure 4:
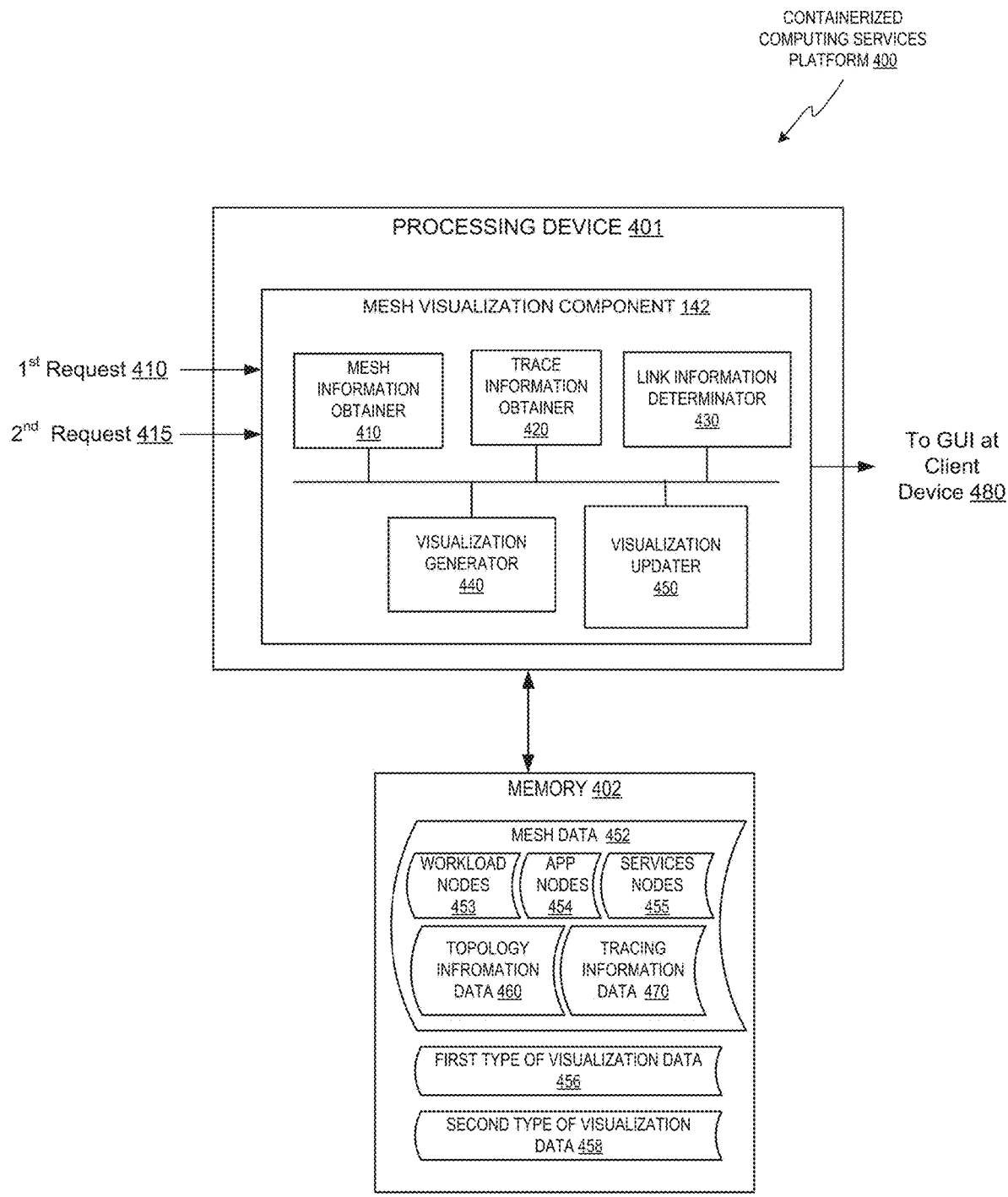
FIG. 4 depicts a block diagram of an example computer system in accordance with one or more aspects of the disclosure.

FIG. 4 depicts a block diagram of a containerized computing service platform 400 operating in accordance with one or more aspects of the disclosure. Containerized computing service platform 400 may be the same or similar to computer system 100 and may include one or more processing devices 401 and one or more memory devices 402. In the example shown, the processing device 401 of containerized computing service platform 400 may include a mesh visualization component 142.

Mesh visualization component 142 may enable the processing device 401 to execute a mesh information obtainer 410 to obtain topology data 460 regarding the nodes of the service mesh. Mesh visualization component 142 may enable the processing device 401 to execute a trace information obtainer 420 to obtain tracing data 470 regarding events processed by a message broker. Mesh visualization component 142 may enable the processing device 401 to execute a message flow information determinator 430 to identify a message flow between at least two nodes of the nodes of the service mesh, where the at least two nodes represent a source and a destination of a traffic associated with the events processed by the message broker.

Mesh visualization component 142 may further enable the processing device 401 to execute a visualization generator 440 to provide, via a graphical user interface (GUI) 480, the visualization of the service-event mesh based on the mesh data 452. The nodes of the service-event mesh may in different types including workload nodes 453, application nodes 454, and service nodes 455 of a containerized computing services platform, and the type of visualization of the service-event mesh can use the different types of nodes. In some implementations, mesh visualization component 142 receives a first request 410 for a first type of visualization of the service-event mesh, the visualization generator 440 may provide visualization of the service-event mesh based on the first type of visualization data 456. In some implementations, mesh visualization component 142 receives a second request 415 for a second type of visualization of the service-event mesh, the visualization generator 440 may provide visualization of the service-event mesh based on the second type of visualization data 458. Mesh visualization component 142 may further enable the processing device 401 to execute a visualization updater 450 to, in response to receiving the second request 415, update from the first type of visualization to the second type of visualization of the service-event mesh. As such, the visualization provided via the GUI may be dynamically updated to display a different service-event mesh graph upon a user request. Furthermore, the visualization may be presented with real-time performance data and other visualization cues reflecting a status of the service-event mesh. For example, performance data such as request rate, response time, and percentage distribution of requests may be identified and provided on the visualization to provide a user with status and monitoring capabilities for the service mesh.

Figure 5:
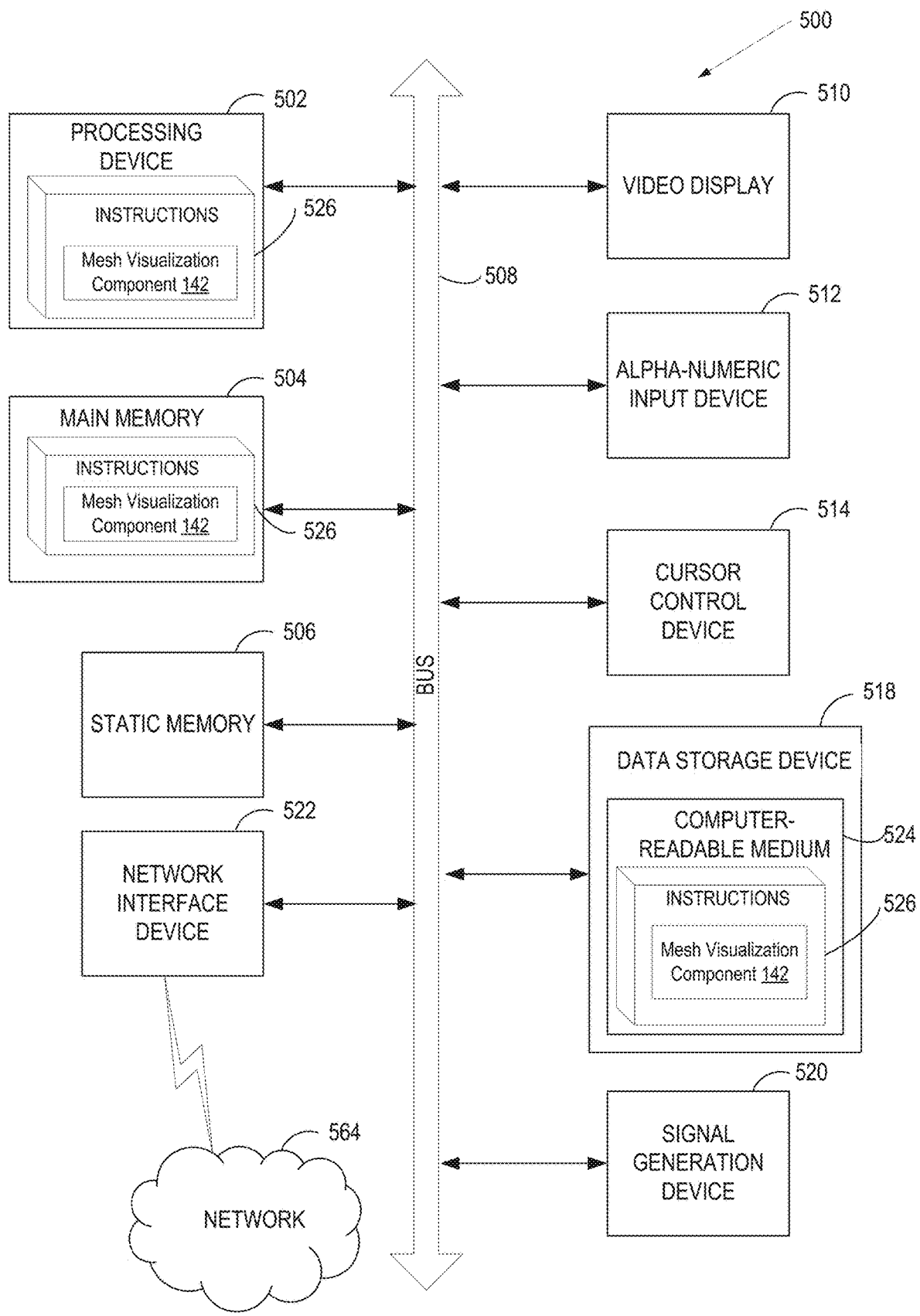
FIG. 5 depicts a block diagram of an illustrative computing device operating in accordance with the examples of the disclosure.

FIG. 5 depicts a block diagram of a computer system operating in accordance with one or more aspects of the disclosure. In various illustrative examples, computer system 500 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing method 300 and for mesh visualization component 142 and the modules illustrated in FIGS. 1, 4, and 5.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
   obtaining, by a processing device, topology data characterizing a service mesh comprising a plurality of nodes;
   obtaining tracing data associated with events processed by a message broker, wherein the message broker serves as an intermediate agent for a message transmitted from a source node to a destination node, wherein the plurality of nodes comprises the source node and the destination node;
   identifying, based on the tracing data, a message flow between the source node and the destination node;
   providing, via a graphical user interface (GUI), visualization of the service mesh reflecting the message flow; and
   switching between the visualization of the service mesh with the message flow and a visualization of the service mesh with the message broker.

2. The method of claim 1, further comprising:
   receiving a request for a type of visualization of the service mesh.

3. The method of claim 2, wherein the type of the visualization comprises at least one of: a workload graph, a versioned application graph, an application graph, or a services graph, wherein the workload graph depicts a plurality of workload nodes in the service mesh, wherein the versioned application graph depicts a plurality of versions of a plurality of application nodes in the service mesh, wherein the application graph depicts a single aggregated version of each application node in the service mesh, and wherein the services graph depicts a plurality of service nodes in the service mesh.

4. The method of claim 1, wherein the nodes comprise workload nodes, application nodes, and service nodes of a containerized computing services platform.

5. The method of claim 1, wherein obtaining the topology data further comprises determining connections between the nodes using exposed application programming interface (API) services of workloads of the service mesh and labels of the workloads.

6. The method of claim 1, wherein the tracing data comprises a tag added to at least one event of the events processed by the message broker, and wherein the at least one event is generated by the source node.

7. The method of claim 1, wherein the tracing data comprises a tag added to at least one event of the events processed by the message broker, and wherein the at least one event is generated by the destination node.

8. The method of claim 1, wherein identifying the message flow further comprises identifying, based on metadata associated with the events, the source node and the destination node of the message associated with the events.

9. A system comprising:
   a memory; and
   a processing device executing a transaction manager and operatively coupled to the memory, the processing device to perform operations comprising:
      obtaining topology data characterizing a service mesh comprising a plurality of nodes;
      obtaining tracing data associated with events processed by a message broker, wherein the message broker serves as an intermediate agent for a message transmitted from a source node to a destination node, wherein the plurality of nodes comprises the source node and the destination node;
      transforming the tracing data to a message flow between the source node and the destination node;
      providing, via a graphical user interface (GUI), visualization of the service mesh with the message flow; and
      switching between the visualization of the service mesh with the message flow and a visualization of the service mesh with the message broker.

10. The system of claim 9, wherein obtaining the topology data further comprises determining connections between the nodes using exposed application programming interface (API) services of workloads of the service mesh and labels of the workloads.

11. The system of claim 9, wherein the tracing data comprises a tag added to at least one event of the events processed by the message broker.

12. The system of claim 9, wherein transforming the tracing data to the message flow further comprises identifying, based on metadata associated with the events, the source node and the destination node of the message associated with the events.

13. A non-transitory machine-readable storage medium storing instructions that cause a processing device to perform operations comprising:
   obtaining topology data characterizing a service mesh comprising a plurality of nodes;
   obtaining tracing data associated with events processed by a message broker, wherein the message broker serves as an intermediate agent for a message transmitted from a source node to a destination node, wherein the plurality of nodes comprises the source node and the destination node;
   identifying, based on the tracing data, a message flow between the source node and the destination node;
   providing, via a graphical user interface (GUI), visualization of the service mesh with the message flow; and
   switching between the visualization of the service mesh with the message flow and a visualization of the service mesh with the message broker.

14. The non-transitory machine-readable storage medium of claim 13, wherein obtaining the topology data further comprises determining connections between the nodes using exposed application programming interface (API) services of workloads of the service mesh and labels of the workloads.

15. The non-transitory machine-readable storage medium of claim 13, wherein the tracing data comprises a tag added to at least one of event of the events processed by the message broker.

16. The non-transitory machine-readable storage medium of claim 13, wherein identifying the message flow further comprises identifying, based on metadata associated with the events, the source node and the destination node of the message associated with the events.

17. The system of claim 9, wherein the operations further comprise:
   receiving a request for a type of visualization of the service mesh.

18. The system of claim 9, wherein the nodes comprise workload nodes, application nodes, and service nodes of a containerized computing services platform.

19. The non-transitory machine-readable storage medium of claim 13, wherein the operations further comprise:
   receiving a request for a type of visualization of the service mesh.

20. The non-transitory machine-readable storage medium of claim 13, the nodes comprise workload nodes, application nodes, and service nodes of a containerized computing services platform.

* * * * *